(12) United States Patent
Wichern et al.

(10) Patent No.: US 11,579,598 B2
(45) Date of Patent: Feb. 14, 2023

(54) MANUFACTURING AUTOMATION USING ACOUSTIC SEPARATION NEURAL NETWORK

(71) Applicant: Mitsubishi Electric Research Laboratories, Inc., Cambridge, MA (US)

(72) Inventors: Gordon Wichern, Boston, MA (US); Jonathan Le Roux, Arlington, MA (US); Fatemeh Pishdadian, Chicago, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 687 days.

(21) Appl. No.: 16/655,272

(22) Filed: Oct. 17, 2019

(65) Prior Publication Data
US 2021/0116894 A1   Apr. 22, 2021

(51) Int. Cl.
*G05B 19/418*   (2006.01)
*G05B 13/02*    (2006.01)
(Continued)

(52) U.S. Cl.
CPC ....... *G05B 19/4188* (2013.01); *G05B 13/027* (2013.01); *G06N 3/0445* (2013.01);
(Continued)

(58) Field of Classification Search
CPC .......... G05B 2219/33325; G05B 2219/37435; G05B 2219/49105; G05B 2219/37433;
(Continued)

(56) References Cited

U.S. PATENT DOCUMENTS 4,918,616 A * 4/1990 Yoshimura ......... G05B 19/4065
                                                    73/587
10,370,093 B1 * 8/2019 Beckman ................ G01S 1/753
(Continued)

FOREIGN PATENT DOCUMENTS

| CN | 110070183 | 7/2019 | |
| EP | 1927830 | 6/2008 | |
| EP | 1927830 A2 * | 6/2008 | ............. G01H 1/003 |

OTHER PUBLICATIONS

Identifying Cutting Sound Characteristics in Machine Tool Industry with a Neural Network, Yasuhiro Ota, AAZAK Corporation, Aug. 2002.*

(Continued)

*Primary Examiner* — Vincent H Tran
(74) *Attorney, Agent, or Firm* — Gennadiy Vinokur; Hironori Tsukamoto

(57) ABSTRACT

A system for controlling an operation of a machine including a plurality of actuators assisting one or multiple tools to perform one or multiple tasks, in response to receiving an acoustic mixture of signals generated by the tool performing a task and by the plurality of actuators actuating the tool, submit the acoustic mixture of signals into a neural network trained to separate from the acoustic mixture a signal generated by the tool performing the task from signals generated by the actuators actuating the tool to extract the signal generated by the tool performing the task from the acoustic mixture of signals, analyze the extracted signal to produce a state of performance of the task, and execute a control action selected according to the state of performance of the task.

19 Claims, 11 Drawing Sheets

(51) Int. Cl.
*G06N 3/04* (2006.01)
*G06N 3/08* (2006.01)
*G06N 3/10* (2006.01)

(52) U.S. Cl.
CPC ............... *G06N 3/08* (2013.01); *G06N 3/10* (2013.01); *G05B 2219/32335* (2013.01); *G05B 2219/50291* (2013.01)

(58) Field of Classification Search
CPC ........ G05B 2219/32335; G05B 19/406; G05B 13/027
See application file for complete search history.

(56) References Cited

U.S. PATENT DOCUMENTS

| | | | | |
|---|---|---|---|---|
| 2009/0248194 | A1* | 10/2009 | Lammering | G05B 19/4163 700/173 |
| 2014/0067321 | A1* | 3/2014 | Zinngrebe | G01H 1/003 702/176 |
| 2015/0258650 | A1* | 9/2015 | Okamoto | G05B 19/406 381/56 |
| 2016/0238486 | A1* | 8/2016 | Bense | G01N 29/4454 |
| 2016/0297044 | A1* | 10/2016 | Dunkin | B23Q 17/0976 |
| 2017/0103776 | A1* | 4/2017 | Kim | G10L 25/24 |
| 2017/0320182 | A1* | 11/2017 | Jeong | B23Q 17/098 |
| 2018/0164757 | A1* | 6/2018 | Matsushima | G05B 13/027 |
| 2019/0195832 | A1* | 6/2019 | Dahme | G01N 29/14 |
| 2019/0208320 | A1* | 7/2019 | Takahashi | H04R 5/04 |
| 2019/0257793 | A1* | 8/2019 | Yazzie | G01N 29/4445 |
| 2020/0026262 | A1* | 1/2020 | Otsu | G06K 9/6218 |
| 2020/0033297 | A1* | 1/2020 | Rudyk | G01N 29/4436 |
| 2020/0251127 | A1* | 8/2020 | Kawaguchi | G06N 20/20 |
| 2020/0408106 | A1* | 12/2020 | Karnofski | F01D 23/00 |

OTHER PUBLICATIONS

Gubin et al. "Using Convolutional Neural Networks to Classify Audio Signal in Noisy Sound Scenes." Global Smart Industry Cong. Nov. 2018, 13. p. 1-6.

Chunhui et al. "A transformer vibration signal separation method based on bp neural network." IEEE international Power Modulator and High Voltage Cong. Jun. 3, 2018, pp. 312-316.

Karamatli et al. "weak label supervision for monaural source separation using non negative denoising variational autoencoders." Cornel University Library. Arxiv.org. Oct. 31, 2018.

Qiuqiang et al. A joint separation classification model for sound event detection of weakly labelled data. 2018 IEEE International Conference on acoustics, speech and signal processing. Apr. 15, 2018. pp. 321-325.

* cited by examiner

MANUFACTURING AUTOMATION USING ACOUSTIC SEPARATION NEURAL NETWORK

TECHNICAL FIELD

This invention relates generally to manufacturing automation using machine learning techniques, and particularly to manufacturing automation using neural network trained to separate signals from acoustic mixtures.

BACKGROUND

Monitoring and controlling safety and quality are very important in manufacturing, where fast and powerful machines can execute complex sequences of operations at high speeds. Deviations from an intended sequence of operations or timing can degrade quality, waste raw materials, cause down times and broken equipment, decrease output. Danger to workers is a major concern. For this reason, extreme care must be taken to carefully design manufacturing processes to minimize unexpected events, and also safeguards need to be designed into the production line, using a variety of sensors and emergency switches.

The types of manufacturing include process and discrete manufacturing. In process manufacturing, products are generally undifferentiated, for example oil, natural gas and salt. Discrete manufacturing produces distinct items, e.g., automobiles, furniture, toys, and airplanes.

One practical approach to increasing the safety and minimizing the loss of material and output is to detect when a production line is operating abnormally, and stop the line down if necessary in such cases. One way to implement this approach is to use a description of normal operation of the production line in terms of ranges of measurable variables, for example temperature, pressure, etc., defining an admissible operating region, and detecting operating points out of that region. This method is common in process manufacturing industries, for example oil refining, where there is usually a good understanding of permissible ranges for physical variables, and quality metrics for the product quality are often defined directly in terms of these variables.

However, the nature of the working process in discrete manufacturing is different from that in process manufacturing, and deviations from the normal working process can have very different characteristics. Discrete manufacturing includes a sequence of operations performed on work units, such as machining, soldering, assembling, etc. Anomalies can include incorrect execution of one or more of tasks, or an incorrect order of the tasks. Even in anomalous situations, often no physical variables, such as temperature or pressure are out of range, so direct monitoring of such variables cannot detect such anomalies reliably.

In addition, complex manufacturing systems can include a combination of process and discrete manufacturing. When the process and the discrete manufacturing are intermingled on a signal production line, the anomaly detection methods designed for different types of manufacturing can be inaccurate. For example, the anomaly detection methods for process manufacturing can aim to detect outliers of the data, while anomaly detection methods for discrete manufacturing can aim to detect incorrect order of the operation executions. To that end, it is natural to design different anomaly detection methods for different class of manufacturing operations. However, usage of these separate detection techniques may become too complicated in the complex manufacturing systems.

To that end, there is a need to develop system and a method suitable for anomaly detection in different types of the manufacturing systems. For example, a method described in U.S. Pub [MERL-3116 Ser. No. 15/938,411] applies the machine learning techniques for anomaly detection for one or combination of process and discrete manufacturing. Using the machine learning, the collected data can be utilized in an automatic learning system, where the features of the data can be learned through training. The trained model can detect anomaly in real time data to realize predictive maintenance and downtime reduction. However, even with the help of machine learning, the data needed to be collected to represent some manufacturing operations can make accurate anomaly detection impractical.

SUMMARY

It is an object of some embodiments to provide system and method suitable for manufacturing automation in complex industrial systems having multiple actuators actuating one or multiple tools to perform one or multiple tasks. Additionally, or alternatively, it is an object of some embodiments to use machine learning to estimate state of performance of these tasks and to control the system accordingly.

Some embodiments are based on recognition that machine learning can be used for data-driven time-series predictive inference for physical systems whose state changes over time according to an unknown underlying dynamical system. For these systems, only observations related to the state of the system are measured. This can be advantageous for controlling complex industrial systems that are difficult to model.

However, some embodiments are based on another recognition that these various machine-learning techniques can be used when the observations unambiguously represent the state of the system, which can be problematic for some situations. Indeed, if a set of observations corresponds uniquely to the state of the system, machine learning methods can be used to design various predictors. However, the sensory data at each time instance may not provide enough information about the actual state of the system. The number of required observations depends on dimensionality d of the system and equals d for linear systems and 2d+1 for non-linear systems. If the collected measurements do not include enough observations, machine learning methods can fail.

Some embodiments are based on realization that instead of considering a state of a system that performs a task it is possible to consider a state of the performance of the task itself. For example, when a system includes multiple actuators for performing one or multiple tasks, the state of the system includes a state of all of these actuators. However, in some situations, the state of an actuator is not a primary concern of the control. Indeed, the state of actuators are needed to guide the performance, e.g., an execution of the task, hence the state of the execution is a primary objective, while the state of the actuators performing the tasks is only a secondary one.

Some embodiments are based on understanding that it is natural to equate the state of the system to the state of performance of the task, because quite often it is possible to measure or observe only the state of the system, and if enough observations are collected, the state of the system can indeed represent the state of the performance. However, in some situations, the state of the system is difficult to measure, and the state of performance of the task is difficult to define.

For example, consider a computer numerical control (CNC) of machining a workpiece with a cutting tool. The state of the system includes states of actuators moving the cutting tool along a tool path. The state of performance of the machining is the state of the actual cutting. Industrial CNC systems can have a number of different and sometimes redundant actuators with a number of state variables in complex non-linear relationships with each other posing difficulties on observing the state of the CNC systems. However, it also can be difficult to measure a state of machining of the workpiece.

Some embodiments are based on realization that a state of performance of the task can be represented by an acoustic signal generated by such performance. For example, a state of performance of CNC machining of a workpiece can be represented by a vibration signal caused by deformation of the workpiece during the machining Hence, if such a vibration signal can be measured, various classification techniques including machine learning methods can be used to analyze such a vibration signal to estimate a state of the performance of the task and to select appropriate control action for controlling the performance.

The problem, however, faced under this approach is that such a vibration signal does not exist in isolation. For example, in systems including a plurality of actuators actuating one or multiple tools to perform one or multiple tasks, a signal generated by the tool performing the task is always mixed with signals generated by the actuators actuating the tool. For example, a vibration signal generated by deformation of a workpiece is always mixed with signals from motors moving a cutting tool. If such a vibration signal could be syntactically generated somehow in isolation or captured somehow in isolation, it would be possible to train a machine learning system such as a neural network to extract such a signal. However, in a number of situations, including CNC machining, such a generation of an isolated signal representing performance of the task is impractical. Similarly, separate recording of different signals by multiple microphones can be impractical as well.

To that end, to streamline the manufacturing automation for systems including a plurality of actuators actuating one or multiple tools to perform one or multiple tasks, there is a need to separate source signals from an acoustic mixture of signals generated by a tool performing a task and by the plurality of actuators actuating the tool. Accordingly, it is an object of some embodiments to train a neural network for sound separation of sound sources of mixed signal in the absence of isolated sound sources. As used herein, at least some of the sound sources in the mixed signal occupy the same time, space, and frequency spectrum in the acoustic mixture.

Some embodiments are based on recognition that such a training can be provided with supervised learning when the sound sources in acoustic mixture can be easily recorded in isolation or identified, e.g., by a human. Such a classification is referred herein as strong labels. In theory, humans can produce an approximation of this type of label, however, it is largely unrealistic to ask a human to precisely label the sound activity in both time and frequency to provide the strong label. It is however realistic to consider having some limited labels as to which sound is active within some time range (weak label). In the general case, such a weak label does not require the sound to be active throughout the whole designated range, and may only occur for a brief instant within the range.

Some embodiments are based on realization that because a structure of manufacturing process is generally known, the sources that generate acoustic signals are generally known as well. To that end, it is possible to provide weak labels for sources of the acoustic mixture representing an operation of the manufacturing system. To that end, some embodiments develop methods that can learn to separate sounds in acoustic mixtures where training data of the acoustic mixtures with only weak labels are available.

Accordingly, some embodiments train a neural network to separate from the acoustic mixture a signal generated by the tool performing the task from signals generated by the actuators actuating the tool. For example, the neural network is trained to separate different signals from the acoustic mixture such that each separated signal belongs to one class of signals present in the operation of the system, while the separated signals sum up to the acoustic mixture. Weak labels identify the classes of signals present in the operation of the system. Each weak label specifies a class of a signal present at some point during the operation.

In one embodiment, the neural network is jointly trained with classifier configured to classify the classes of the signals identified by the weak labels. For example, the neural network can be jointly trained with the classifier to minimize a loss function including a cross-entropy term between outputs of the classifier and outputs of the neural network. Such a joint training considers the fact that it is difficult to classify signals that do not exist in isolation and allows end-to-end training of the separation and classification neural networks.

In some implementation, additional constraints are added to the training of the neural network for quality assurance. For example, in one embodiment, the neural network is trained such that when a separated signal of a class identified by the weak labels is submitted as an input to the neural network, the neural network produces this separated signal as an output. Additionally, or alternatively, in one embodiment, the neural network is trained such that the separated signals from two or more classes identified by the weak labels are recombined and fed back to the network to be re-separated, while an adversarial loss discriminates between real acoustic mixtures and the synthetic recombined mixtures.

Having a neural network trained for signal separation, some embodiments use the outputs of this network to train a state estimator for estimating the state of performance of a task. For example, in one embodiment, the state estimator is trained on the signals generated by the tool performing the task and extracted by the neural network from different acoustic mixtures of different repetitions of the operation of the system. Notably, in some embodiments, each sample of the extracted signal generated by the tool performing the task defines a state of performance of the task, while insufficient to define a state of the operation of the system. However, the state of performance of the task is sufficient to select appropriate control action. In such a manner, the embodiments provide dimensionality reduction in manufacturing automation applications.

Additionally, or alternatively to dimensionality reduction, some embodiments allow to independently control different tools performing different tasks of operations. For example, when the analysis is performed on signals representing the state of the entire system, such an analysis can provide a control for the entire system. However, when analyses are performed separately for different tools performing different tasks, independent control of the tools is possible.

To that end, when during the operation of the system multiple tools perform multiple tasks, some embodiments perform independent control of the tasks. For example, one embodiment controls a system having a first tool performing a first task and a second tool performing a second task. The neural network is trained to separate from the acoustic mixture a first signal generated by the first tool performing the first task and a second signal generated by the second tool performing the second task. During the operation of the system, the first signal and the second signal are extracted from the acoustic mixture using the neural network and analyzed independently from each other to estimate a first state of performance of the first task and a second state of performance of the second task. The embodiment is configured to execute a first control action selected according to the first state and execute a second control action selected according to the second state.

Accordingly, one embodiment discloses a system for controlling an operation of a machine including a plurality of actuators assisting one or multiple tools to perform one or multiple tasks. The system includes an input interface configured to receive during the operation of the system an acoustic mixture of signals generated by a tool performing a task and by the plurality of actuators actuating the tool; a memory configured to store a neural network trained to separate from the acoustic mixture a signal generated by the tool performing the task from signals generated by the actuators actuating the tool; and a processor configured to submit the acoustic mixture of signals into the neural network to extract the signal generated by the tool performing the task from the acoustic mixture of signals; analyze the extracted signal to produce a state of performance of the task; and execute a control action selected according to the state of performance of the task.

Another embodiment discloses a method for controlling an operation of a machine including a plurality of actuators assisting one or multiple tools to perform one or multiple tasks, wherein the method uses a processor coupled with stored instructions implementing the method, wherein the instructions, when executed by the processor carry out steps of the method. The method includes receiving an acoustic mixture of signals generated by a tool performing a task and by the plurality of actuators actuating the tool; submitting the acoustic mixture of signals into a neural network trained to separate from the acoustic mixture a signal generated by the tool performing the task from signals generated by the actuators actuating the tool to extract the signal generated by the tool performing the task from the acoustic mixture of signals; analyzing the extracted signal to produce a state of performance of the task; and executing a control action selected according to the state of performance of the task.

Yet another embodiment discloses a non-transitory computer readable storage medium embodied thereon a program executable by a processor for performing a method. The method includes receiving an acoustic mixture of signals generated by a tool performing a task and by the plurality of actuators actuating the tool; submitting the acoustic mixture of signals into a neural network trained to separate from the acoustic mixture a signal generated by the tool performing the task from signals generated by the actuators actuating the tool to extract the signal generated by the tool performing the task from the acoustic mixture of signals; analyzing the extracted signal to produce a state of performance of the task; and executing a control action selected according to the state of performance of the task.

DETAILED DESCRIPTION

Figure 1A:
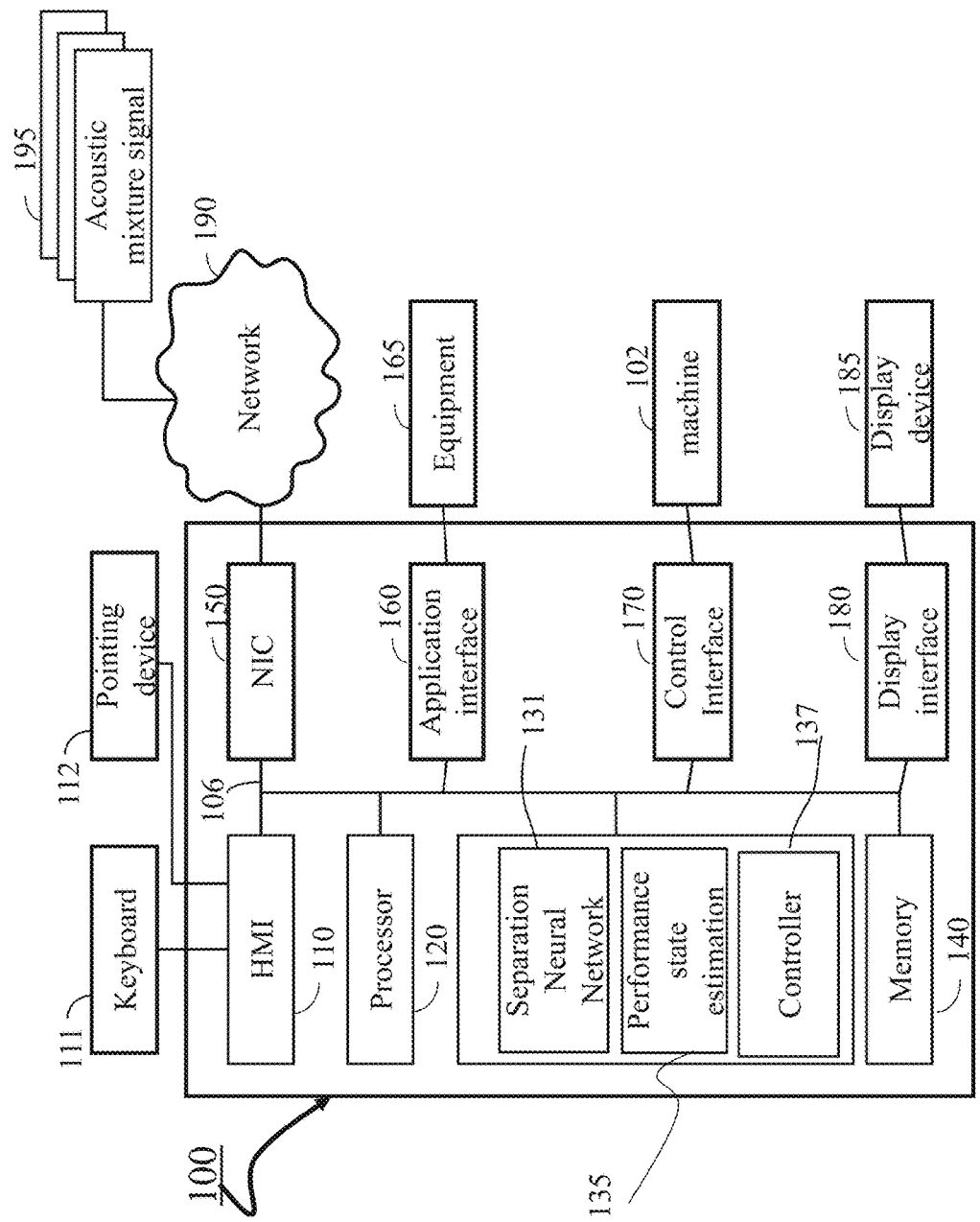
FIG. 1A and FIG. 1B show block diagrams of a system for separating the signals corresponding to different actuators that emit vibration during operation of a machine, and using these separated signals for subsequent monitoring tasks according to some embodiments.
Figure 1B:
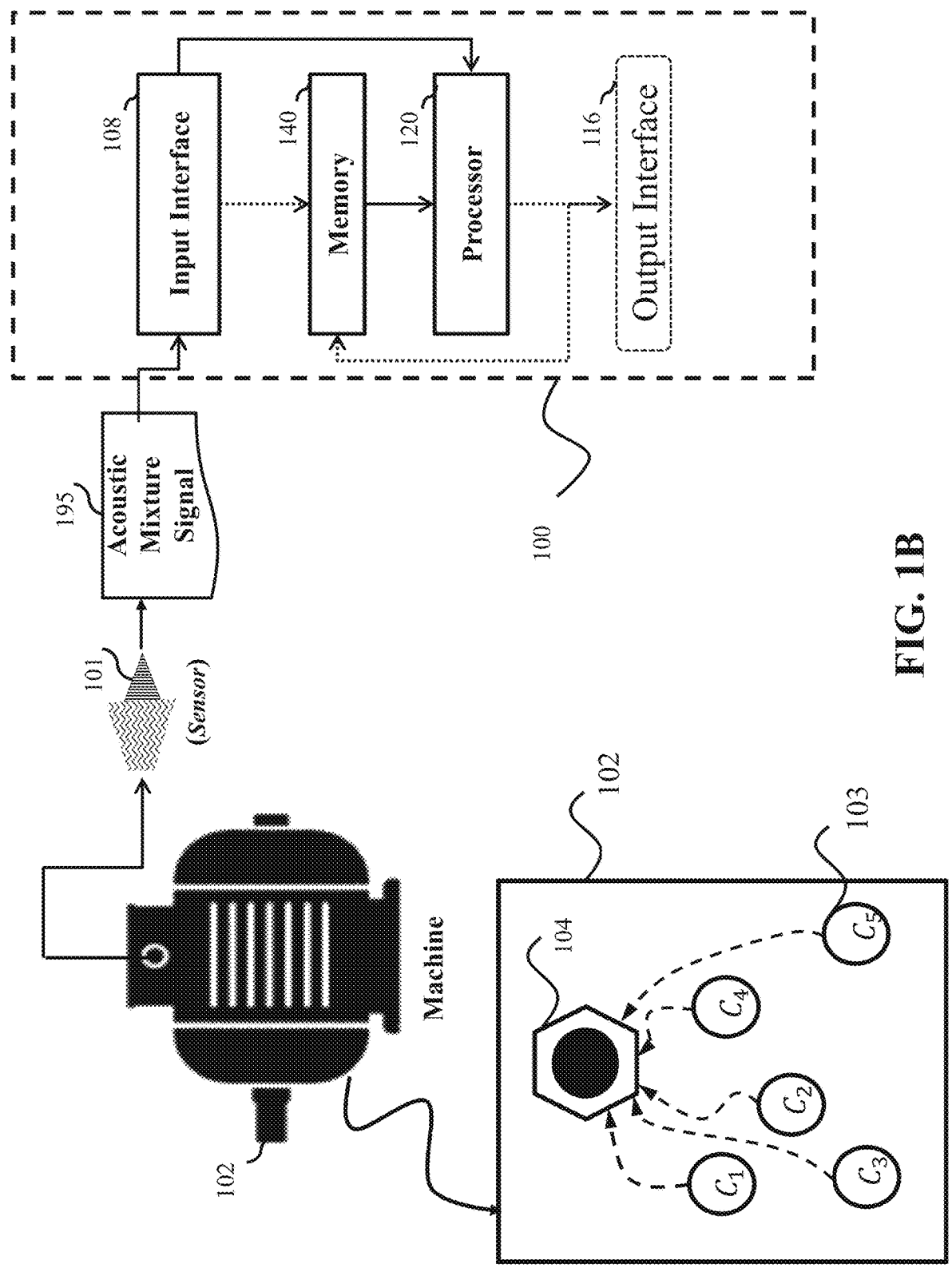

FIG. 1A and FIG. 1B show block diagrams of a system 100 for analyzing performance and controlling the operation of a machine 102 according to some embodiments. The machine 102 may include one or multiple actuators (components) 103 each performing a unique task and connected to a coordinating device 104. Examples of the tasks performed by the actuators 103 could be machining, soldering or assembling. In some embodiments, the machine actuators 103 may operate simultaneously, but the coordinating device 104 may need to control each actuator individually. Example of the coordinated device 104 is a tool for performing a task. For example, in some embodiments, the system 100 controls an operation of a machine including a plurality of actuators assisting one or multiple tools to perform one or multiple tasks.

The sensor 101, which in some embodiments can be a microphone, or an array of multiple microphones, captures the vibrations produced by the individual actuators 103 produced during the operation of the machine 102. Additionally, some machine actuators 103, may be co-located in the same spatial area such that they cannot be captured individually by the sensor 101, even if the sensor 101 is a multi-microphone array. Therefore, the vibration signal captured by the sensor 101 is an acoustic mixture signal 195, composed of the sum of the vibration signals produced by the individual machine actuators 103. In some embodiments, at least some of the sound sources in spectrogram of the acoustic mixture signal occupy the same time, space, and frequency spectrum in the acoustic mixture.

In some embodiments, it may not be possible to estimate the performance state of each machine actuator 103 from the acoustic mixture signal 195, because the quieter actuators may be obscured by louder actuators. To this end, the system 100 includes a separation neural network 131 which can isolate the vibrations produced by the individual machine actuators 103 from the acoustic mixture signal 195. Once the signals for each machine actuator 103 are isolated from the acoustic mixture signal 195 they can be used for performance state estimation 135 and execution 137 of the task.

To that end, the system 100 includes various modules executed by the processor 120 to control the operation of the machine. The processor submits the acoustic mixture of signals into the neural network 131 to extract the signal generated by the tool performing the task from the acoustic mixture of signals, analyzes the extracted signal using the estimator 135 to produce a state of performance of the task, and execute a control action selected by the controller 137 according to the state of performance of the task and communicated through the control interface 170 for applications such as avoiding faults and maintaining smooth operation in the machine 102.

The system 100 can have a number of input 108 and output 116 interfaces connecting the system 100 with other systems and devices. For example, a network interface controller 150 is adapted to connect the system 100 through the bus 106 to a network 190. Through the network 190, either wirelessly or through the wires, the system 100 can receive the acoustic mixture input signal 195. In some implementations, a human machine interface 110 within the system 100 connects the system to a keyboard 111 and pointing device 112, wherein the pointing device 112 can include a mouse, trackball, touchpad, joy stick, pointing stick, stylus, or touchscreen, among others. Through the interface 110 or NIC 150, the system 100 can receive data, such as the acoustic mixture signal 195 produced during operation of the machine 102.

The system 100 includes an output interface 116 configured to output the separated acoustic signals corresponding to the vibrations of each actuator 103 produced during operation of the machine 102, or the output of a performance state estimation system 135 that operates on the separated acoustic signals. For example, the output interface can include a memory to render the separated acoustic signals or state estimation results. For example, the system 100 can be linked through the bus 106 to a display interface 180 adapted to connect the system 100 to a display device 185, such as a speaker, headphones, computer monitor, camera, television, projector, or mobile device, among others. The system 100 can also be connected to an application interface 160 adapted to connect the system to equipment 165 for performing various operations.

The system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through the bus 106 to one or more input and output devices. These instructions implement a method for separating the vibration signals produced during operation of the machine 102 for performance estimation and future control.

Some embodiments are based on realization that instead of considering a state of a system that performs a task it is possible to consider a state of the performance of the task itself. For example, when a system includes multiple actuators for performing one or multiple tasks, the state of the system includes a state of all of these actuators. However, in some situations, the state of an actuator is not a primary concern of the control. Indeed, the state of actuators are needed to guide the performance, e.g., an execution of the task, hence the state of the execution is a primary objective, while the state of the actuators performing the tasks is only a secondary one.

However, in some situations, the state of the system is difficult to measure, and the state of performance of the task is difficult to define. For example, consider a computer numerical control (CNC) of machining a workpiece with a cutting tool. The state of the system includes states of actuators moving the cutting tool along a tool path. The state of performance of the machining is the state of the actual cutting. Industrial CNC systems can have a number of different and sometimes redundant actuators with a number of state variables in complex non-linear relationships with each other posing difficulties on observing the state of the CNC systems. However, it is also can be difficult to measure a state of machining of the workpiece.

Some embodiments are based on realization that a state of performance of the task can be represented by an acoustic signal generated by such performance. For example, a state of performance of CNC machining of a workpiece can be represented by a vibration signal caused by deformation of the workpiece during the machining Hence, if such a vibration signal can be measured, various classification techniques including machine learning methods can be used to analyze such a vibration signal to estimate a state of the performance of the task and to select appropriate control action for controlling the performance.

The problem, however, faced under this approach is that such a vibration signal does not exist in isolation. For example, in systems including a plurality of actuators actuating one or multiple tools to perform one or multiple tasks, a signal generated by the tool performing the task is always mixed with signals generated by the actuators actuating the tool. For example, a vibration signal generated by deformation of a workpiece is always mixed with signals from motors moving a cutting tool. If such a vibration signal can be syntactically generated somehow in isolation or captured somehow in isolation, it would be possible to train a neural network to extract such a signal. However, in a number of situations, including CNC machining, such a generation of an isolated signal representing performance of the task is impractical. Similarly, separate recording of different signals by multiple microphones can be impractical as well.

Figure 1C:
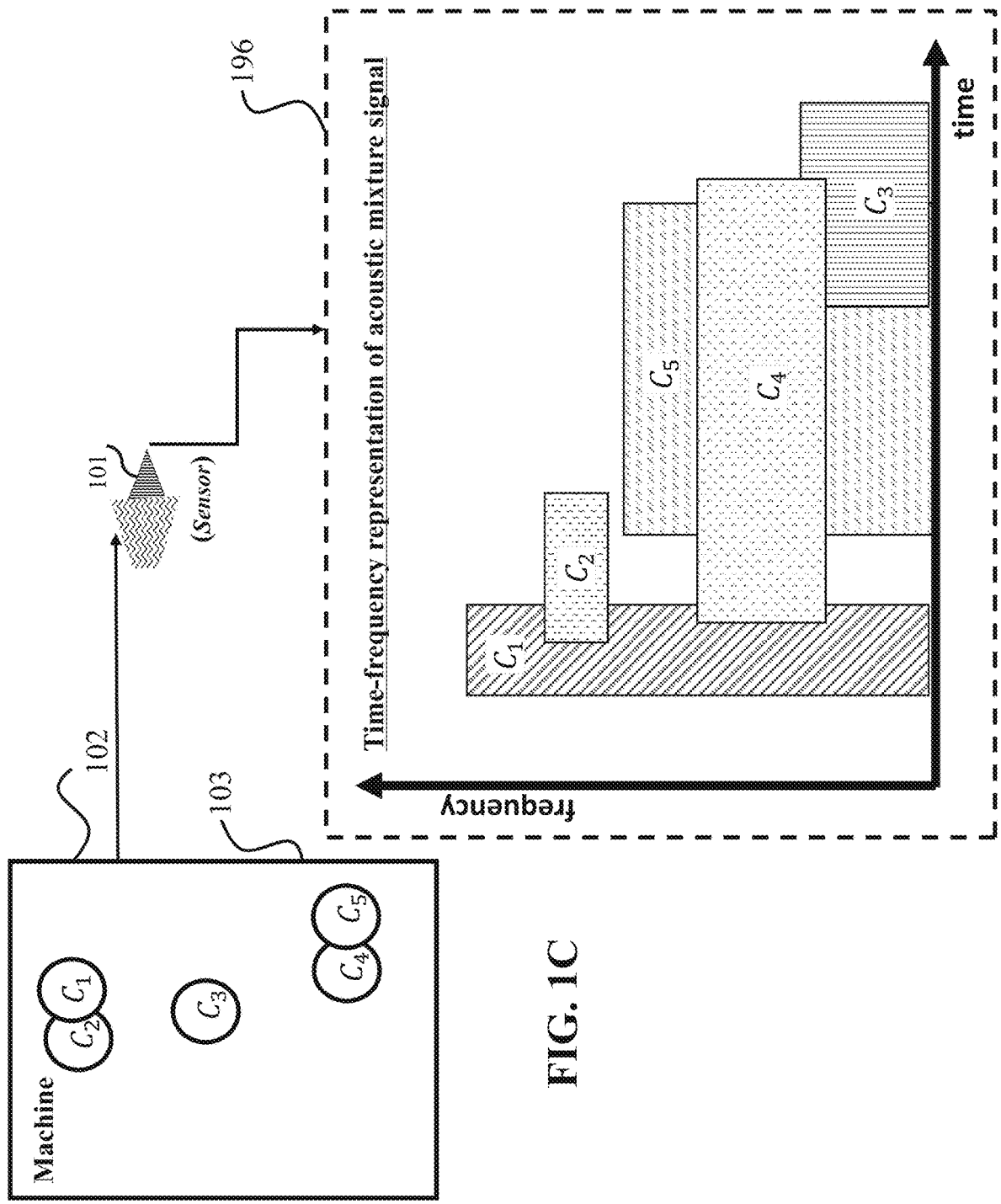
FIG. 1C shows a spectrogram of acoustic mixture of signals generated by a tool performing a task and by the plurality of actuators actuating the tool according to some embodiments.

FIG. 1C shows a spectrogram of acoustic mixture of signals 196 generated by a tool performing a task 102 and by the plurality of actuators actuating the tool 103 according to some embodiments. In the situation where the sensor 101 is a single microphone, the signal produced by all machine actuators 103 may overlap in both time and frequency 196. In this situation various acoustic signal processing techniques such as frequency or time selective filtering are not effective at isolating the individual acoustic signals produced by the machine actuators. In the situation where the sensor 101 is a microphone array, it is possible by accounting for the difference in delay between the different microphones in the array, to isolate sources that produce sound signals at spatially distinct locations. For example, in FIG. 1C, the machine 102 includes actuators 103 indicated by $C_1, \ldots C_5$, and a microphone array could isolate the signal produced by actuator $C_3$, since it is located in a spatially unique location. However, because the pairs of signals ($C_1$, $C_2$) and ($C_4$, $C_5$) overlap both spatially based on their physical location in the machine 102 and overlap in both time and frequency based on the acoustic signals spectrograms 196 they cannot be separated by conventional techniques.

To that end, to streamline the manufacturing automation for systems including a plurality of actuators actuating one or multiple tools to perform one or multiple tasks, there is a need to separate source signals from an acoustic mixture of signals generated by a tool performing a task and by the plurality of actuators actuating the tool. Accordingly, it is an object of some embodiments to train a neural network for sound separation of sound sources of mixed signal in the absence of isolated sound sources.

In some situations, at least some of the sound sources occupy the same time and/or frequency spectrum in the spectrogram of acoustic mixture. For example, in one embodiment, the sound sources in the mixture occupy the same region in the room making usage of microphone array techniques impractical. Additionally, or alternatively, the acoustic mixture of some embodiments comes from only a single channel of an output of a single microphone.

Some embodiments are based on recognition that such a training can be provided with supervised learning when the sound sources in acoustic mixture can be easily recorded in isolation or identified, e.g., by a human. Such a classification is referred herein as strong labels. In theory, humans can produce an approximation of this type of label, however, it is largely unrealistic to ask a human to precisely label the sound activity in both time and frequency to provide the strong label. It is however realistic to consider having some limited labels as to which sound is active within some time range (weak label). In the general case, such a weak label does not require the sound to be active throughout the whole designated range, and may only occur for a brief instant within the range.

Some embodiments are based on realization that because a structure of manufacturing process is generally known, and the sources that generate acoustic signals are generally known as well. To that end, it is possible to provide weak labels for sources of the acoustic mixture representing an operation of the manufacturing system. To that end, some embodiments develop methods that can learn to separate sounds in acoustic mixtures where training data of the acoustic mixtures with only weak labels are available.

Accordingly, some embodiments train a neural network 131 to separate from the acoustic mixture a signal generated by the tool performing the task from signals generated by the actuators actuating the tool. For example, the neural network is trained to separate different signals from the acoustic mixture such that each separated signal belongs to one class of signals present in the operation of the system, while the separated signals sum up to the acoustic mixture. Weak labels identify the classes of signals present in the operation of the system. Each weak label specifies a class of a signal present at some point during the operation.

Figure 2:
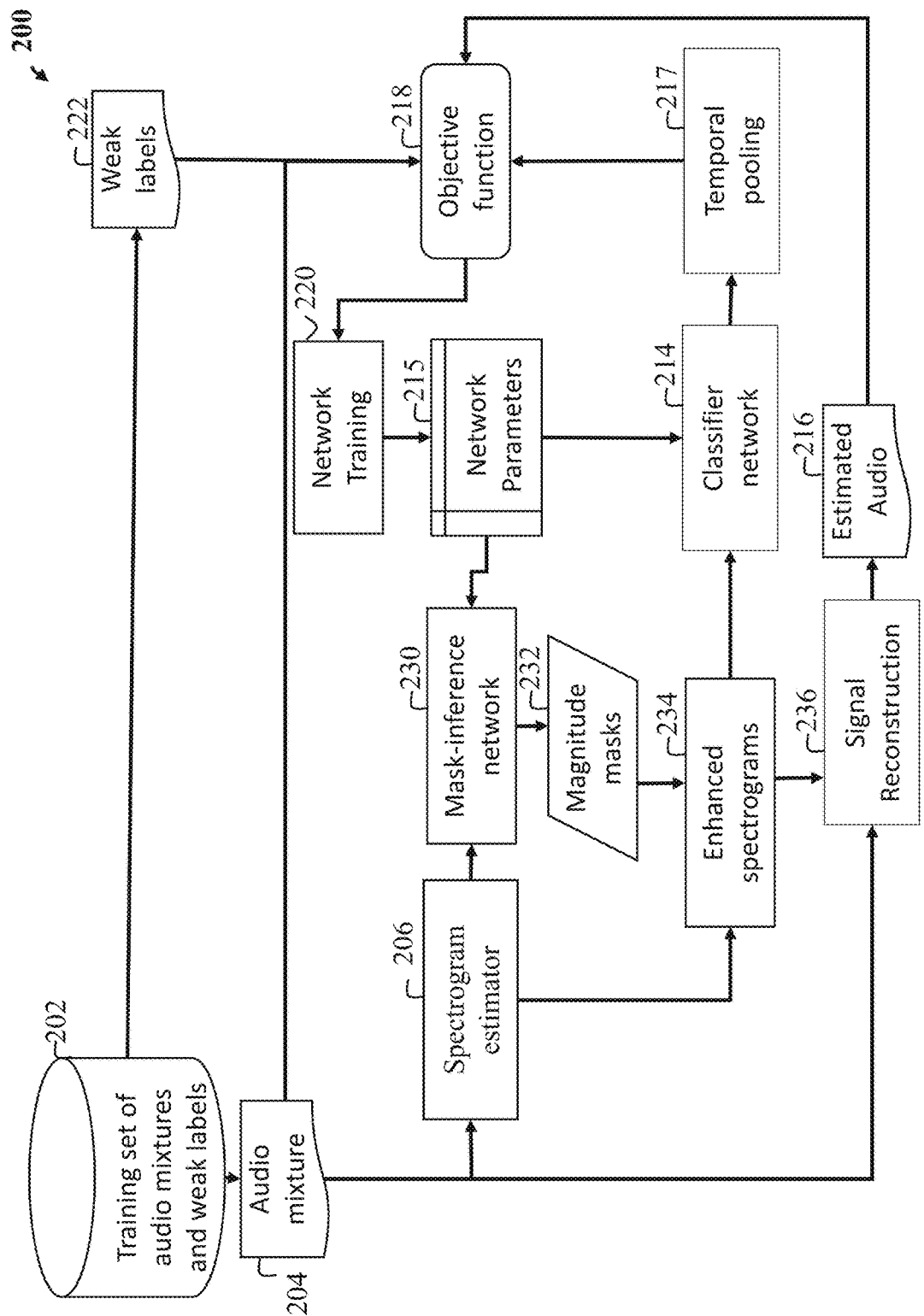
FIG. 2 shows a flow diagram illustrating the training of an acoustic signal processing system for source separation according to some embodiments.

FIG. 2 is a flow diagram illustrating training of an acoustic signal processing system 200 for separating an acoustic mixture signal, according to some embodiments of the present disclosure. The system illustrates a general source separation scenario, in which the system estimates multiple target acoustic signals from a mixture of target acoustic signals and potentially other non-target sources such as noise. In the example where the target acoustic signals are produced by vibrations from actuators of a machine, and it is not possible for these vibrations to exist in isolation, the training targets for the source separation system are identified by weak-labels, that is only the presence/absence of a source in a particular block of time is required for training, not isolated sources. The acoustic mixture input signal 204 includes the sum of multiple overlapping sources and is sampled from a training set containing an acoustic mixture signal and the corresponding weak labels 222 recorded during machine operation 202.

The mixture input signal 204 is processed by a spectrogram estimator 206 to compute a time-frequency representation of the acoustic mixture. The spectrogram is then input to a mask-inference network 230, using stored network parameters 215. The mask inference network 230 makes a decision as to the presence of each source class in each time frequency bin of the spectrogram, and estimates a set of magnitude masks 232. There is one magnitude mask for each source, and the set of enhanced spectrograms 234 is computed by multiplying each mask with the complex time-frequency representation of the acoustic mixture. The set of estimated acoustic signal waveforms 216 are obtained by passing each of the enhanced spectrograms 234 through the signal reconstruction process 236 that inverts the time-frequency representation computed by the spectrogram estimator 206.

The enhanced spectrograms 234 can be passed through a classifier network 214 using stored network parameters 215. The classifier network provides for each time frame of each enhanced spectrogram a probability as to whether a given source class is present. The classifier operates once for each time frame of the spectrogram, however the weak labels 222, may have a much lower time resolution than the spectrogram, so the classifier network 214 output is passed through a temporal pooling 217 module, which in some embodiments can take the maximum over all frame-level decisions corresponding to one weak-label time-frame, take the average over frame-level decisions, or use some other pooling operation to combine the frame-level decisions. The objective function can be used by a network training module 220 to update the network parameters 215.

Figure 3A:
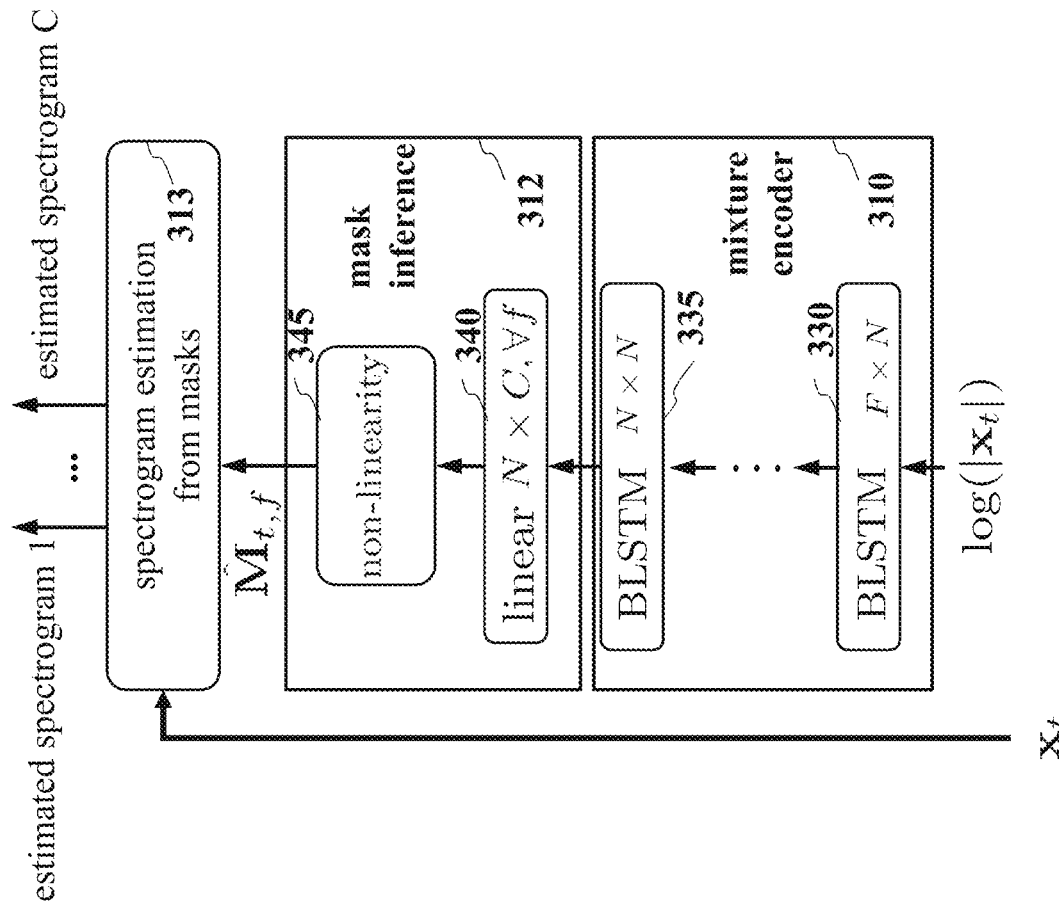
FIG. 3A shows a block diagram illustrating a single-channel mask inference source separation network architecture according to some embodiments.

FIG. 3A is a block diagram illustrating a single-channel mask inference network architecture 300A, according to embodiments of the present disclosure. A sequence of feature vectors obtained from the input mixture, for example the log magnitude of the short-time Fourier transform of the input mixture, is used as input to a mixture encoder 310. For example, the dimension of the input vector in the sequence can be F. The mixture encoder 310 is composed of multiple bidirectional long short-term memory (BLSTM) neural network layers, from the first BLSTM layer 330 to the last BLSTM layer 335. Each BLSTM layer is composed of a forward long short-term memory (LSTM) layer and a backward LSTM layer, whose outputs are combined and use as input by the next layer. For example, the dimension of the output of each LSTM in the first BLSTM layer 330 can be N, and both the input and output dimensions of each LSTM in all other BLSTM layers including the last BLSTM layer 335 can be N. The output of the last BLSTM layer 335 is used as input to a mask inference module 312, including a linear neural network layer 340 and a non-linearity 345. For each time frame and each frequency in a time-frequency domain, for example the short-time Fourier transform domain, the linear layer 340 uses output of the last BLSTM layer 335 to output C numbers, where C is the number of target sources to be separated. The non-linearity 345 is applied to this set of C numbers for each time frame and each frequency, leading to mask values which indicate, for each time frame, each frequency, and each target source, the dominance of that target source in the input mixture at that time frame and that frequency. A separation encoding estimation from masks module 313 uses these masks, together with a representation of the input mixture in the time-frequency domain for which the masks were estimated, for example the magnitude short-time Fourier transform domain, to output separation encodings for each target source. For example, the separation encoding estimation from masks module 313 can multiply the mask for a target source with the magnitude short-time Fourier transform of the input mixture to obtain an estimate of the magnitude short-time Fourier transform of the separated signal for that target source if it had been observed in isolation, used as separation encoding for that target source.

Figure 3B:
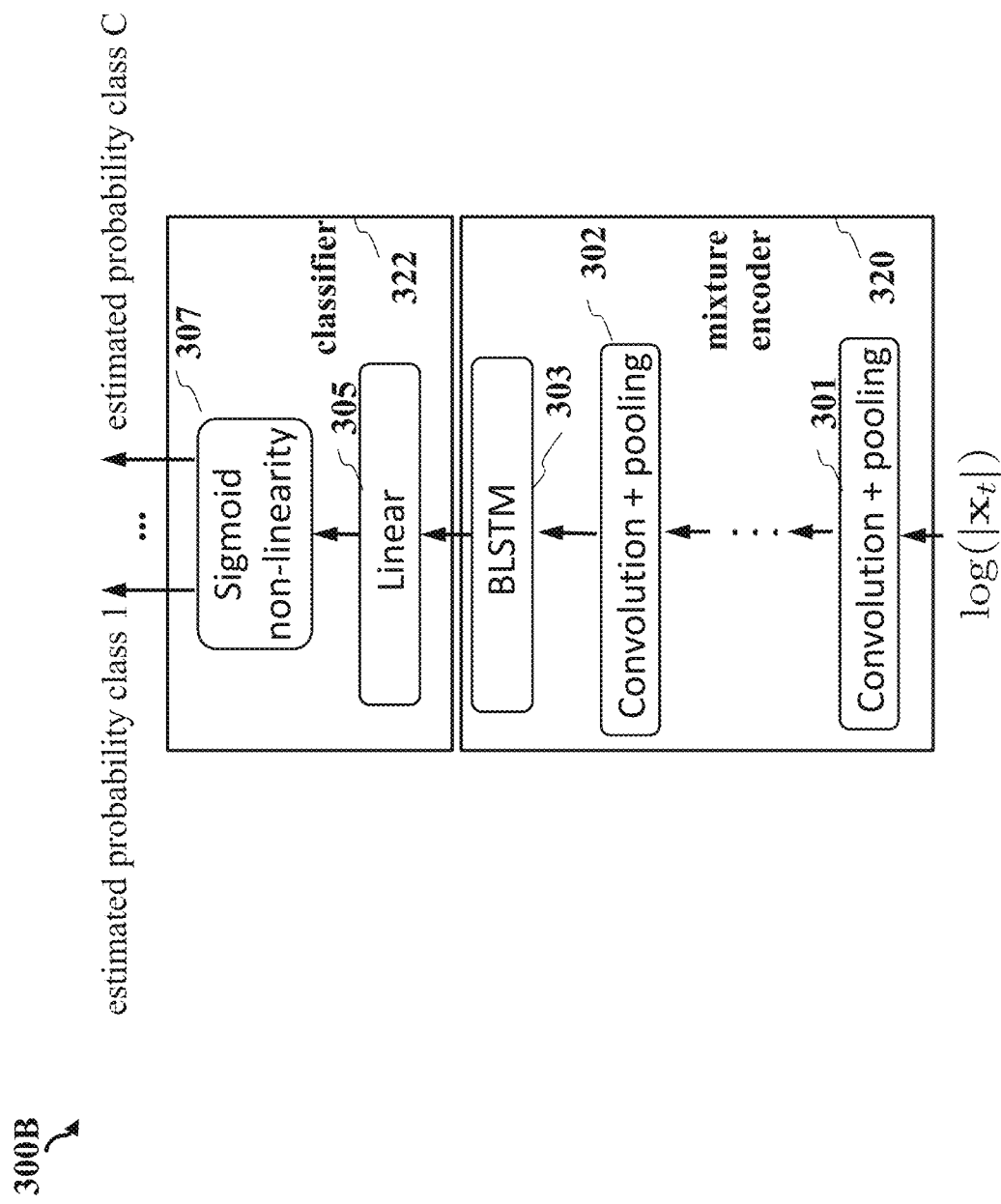
FIG. 3B shows a block diagram illustrating a convolutional recurrent network architecture for sound event classification according to some embodiments.

FIG. 3B is a block diagram illustrating a single-channel convolutional recurrent network classification architecture 300B, according to embodiments of the present disclosure. A sequence of feature vectors obtained from the input mixture, for example the log magnitude of the short-time Fourier transform of the input mixture, is used as input to a mixture encoder 320. For example, the dimension of the input vector in the sequence can be F. The mixture encoder 320 is composed of multiple convolutional blocks from the first convolutional block 301 to the last convolutional block 302, followed by a recurrent BLSTM layer 303. Each convolutional block consists of a convolutional layer with learned weights and biases followed by pooling operations in both the time and frequency dimensions, which reduces the input dimensions to subsequent layers. The BLSTM layer 303 at the end of the mixture encoder 320 is composed of a forward long short-term memory (LSTM) layer and a backward LSTM layer, whose outputs are combined and used as input to the classifier module 322. The classifier module 322, includes a linear neural network layer 305 and a module implementing a sigmoid non-linearity 307. There are C numbers output by the classifier module 322 for each time-frame of the input signal, which represent the probability that the given type of source is active in the present time frame.

Figure 4:
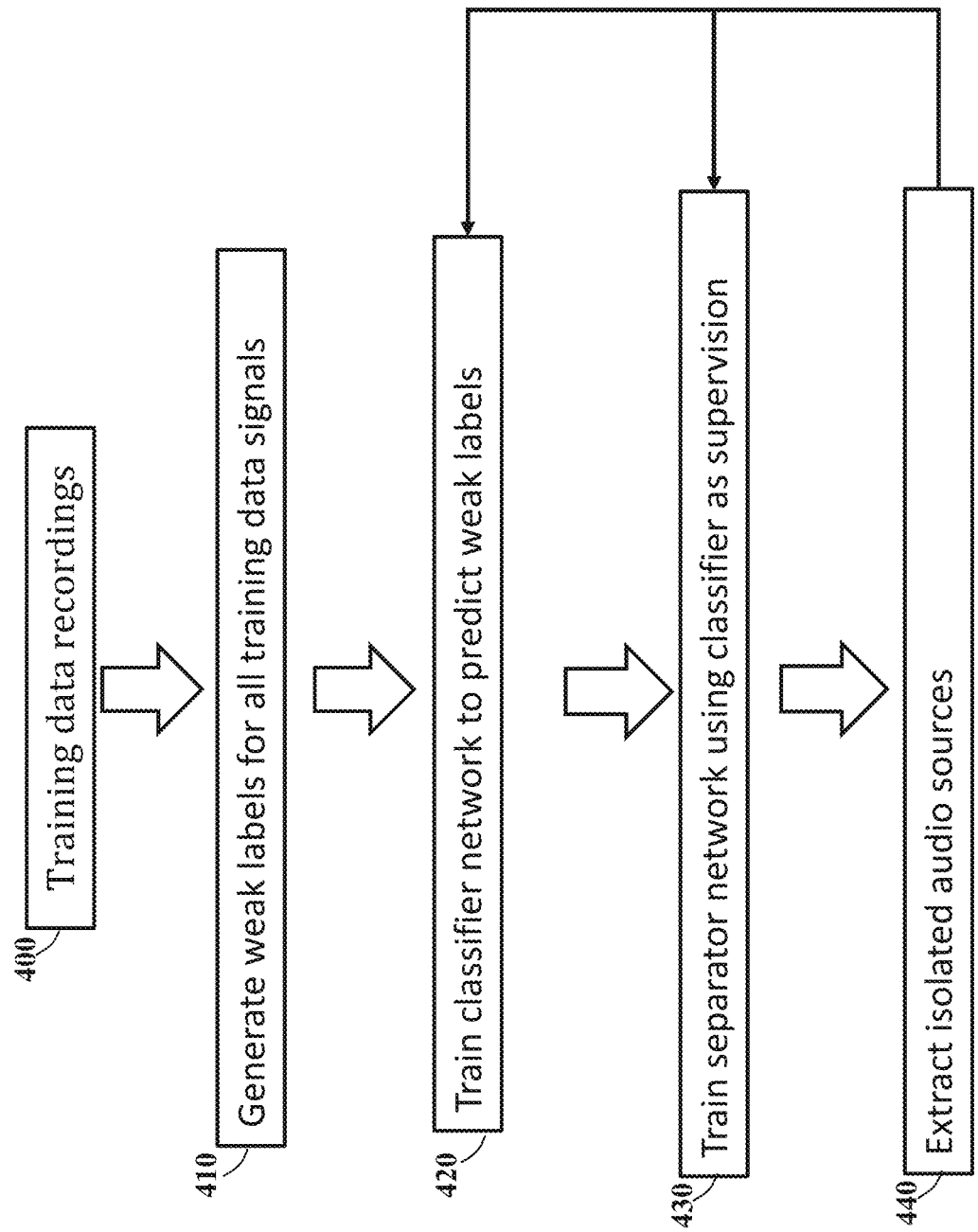
FIG. 4 shows a flow diagram illustrating some method steps for training an acoustic source separation network with weak labels according to some embodiments.

FIG. 4 is a flow diagram of a method for data collection and training a neural network for separating acoustic mixture signals that are not required to exist in isolation or be spatially separated from one another. A sequence of acoustic recordings from the machine or sound environment containing the signals to be separated is collected in order to form the set of training data recordings 400. These recordings are annotated to generate weak labels for all training data signals 410. This annotation procedure could include notes taken on the time periods when sources are active and inactive collected during the time when the training data recordings 400 were collected. Additionally, or alternatively, the weak labels for all training data signals 410 can be collected forensically by listening to the training data recordings 400 and annotating time periods when sources to be separated are active and inactive. Additionally, or alternatively, the weak labels are determined based on specification of the operation of the machine under control.

The next step is to train a classifier to predict weak labels 420 for each training data signal 400 using the weak labels for all training data signals 410 as targets. This classifier may also be referred to as a sound event detection system. Subsequently, a separator network is trained using the classifier as supervision 430, which is described in further detail below. The separator network then extracts the isolated acoustic sources 440, which is a set of signals, where each separated signal belongs to only a single class or signal type. These separated signals can then be used to further train the classifier 420 to predict only the class of the separated signal, while all other class outputs are zero. Furthermore, the training of the separator network 430 can also take as input previously separated signals, and the weights of the network can be updated such that correctly separated signals are passed through separator network unchanged.

Figure 5:
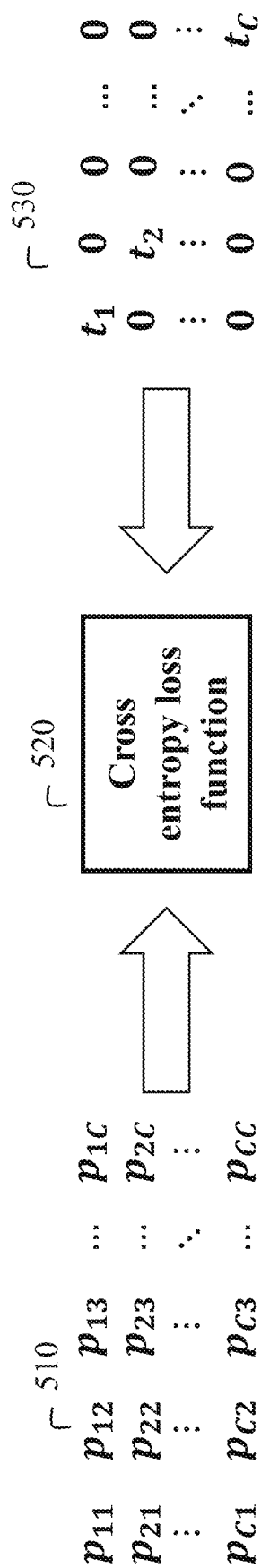
FIG. 5 shows a schematic of classification loss function and targets necessary for enforcing separated signals according to some embodiments.

FIG. 5 shows a schematic illustrating the relationship between weak-labels and classifier outputs that promote signal separation according to some embodiments. In these embodiments, the neural network is a jointly trained with the classifier to minimize a loss function including a cross-entropy term between the weak labels and the of the separation neural network run through the classifier. The illustration of FIG. 5 is for a single time frame, and is repeated at the time resolution of which weak labels are available.

The classifier output 510 is obtained by running each of the C signals extracted by the separation network though the classifier. That is, each row of the classifier output matrix 510 corresponds to the classifier output for one separated signal. The weak-label target matrix 530 arranges the provided weak-labels in such a way that they can be used for training the separation system. For each of the C signal classes, we have $t_i=0$ if a signal of class i is not present, and $t_i=1$ if a signal of class i is present. For classifier training, the cross entropy loss function 520 only requires the diagonal elements of the weak-label target matrix 530 with classifier output from the acoustic mixture, and can be mathematically expressed as $$H(t_i, p_i) = -\sum_{i=1}^{C} [t_i \log(p_i) + (1 - t_i)\log(1 - p_i)]$$

Where $p_i$ for i=1, . . . , C is the classifier output when operating on the acoustic mixture signal for class i.

However, because we require separated signals, the embodiments enforce the off-diagonal terms in the classifier output matrix 510 to equal zero in the weak-label target matrix 530. This helps in enforcing that each separated signal belongs to only a single source class. Thus, the cross entropy loss function 520 for separation can be mathematically expressed as:

$$L_{Class} = \sum_{i=1}^{C} H(t_i, p_{ii}) + \sum_{i=1}^{C} \sum_{j \neq i} H(0, p_{ij})$$

where $H(t_i, p_{ii})$ is the cross entropy loss defined above. One issue with using a classification loss to train a separation system is that the classifier can often make its decision based on only a small subset of the available frequency spectrum, and if the separator learns to separate only a portion of the spectrum the goal of extracting isolated signals will not be achieved. To avoid this another loss term is added that forces the extracted signals for all active sources to sum to the acoustic mixture signal, and penalizes any energy that belongs to inactive sources. Mathematically this is expressed as:

$$L_{Mag} = \sum_{f} \left| X(f) - \sum_{i=1}^{C} t_i * \hat{S}_i(f) \right| + \sum_{f} \sum_{i=1}^{C} (1 - t_i) * \hat{S}_i(f)$$

where f is the frequency index, X(f) is the acoustic mixture magnitude, and $\hat{S}_i(f)$ is magnitude of the separated source. Finally, combining these two actuators the overall loss function is performed as:

$$L_{overall} = L_{Class} + \alpha L_{Mag}$$

where $\alpha$ is a term allowing for weighting the relative importance of each loss actuator.

In such a manner, this disclosure presents a system and method for manufacturing automation using an acoustic separation neural network. The machine learning algorithm proposed in the disclosure uses a neural network to isolate individual signals caused by the vibration of different parts in a manufacturing scenario. Furthermore, because the vibration signals composing the acoustic mixture may not exist in isolation or in such a way that they can be spatially separated from one another, the proposed system can be trained using weak labels. In this case, weak-labels refer to only having access to time periods when different sources are active in an acoustic mixture, rather than the isolated signals that compose the mixture. Once the signals composing the acoustic mixture are separated, they can be used monitor the performance state of the individual machine parts, or as a control signal to control the different actuators independently.

Figure 6:
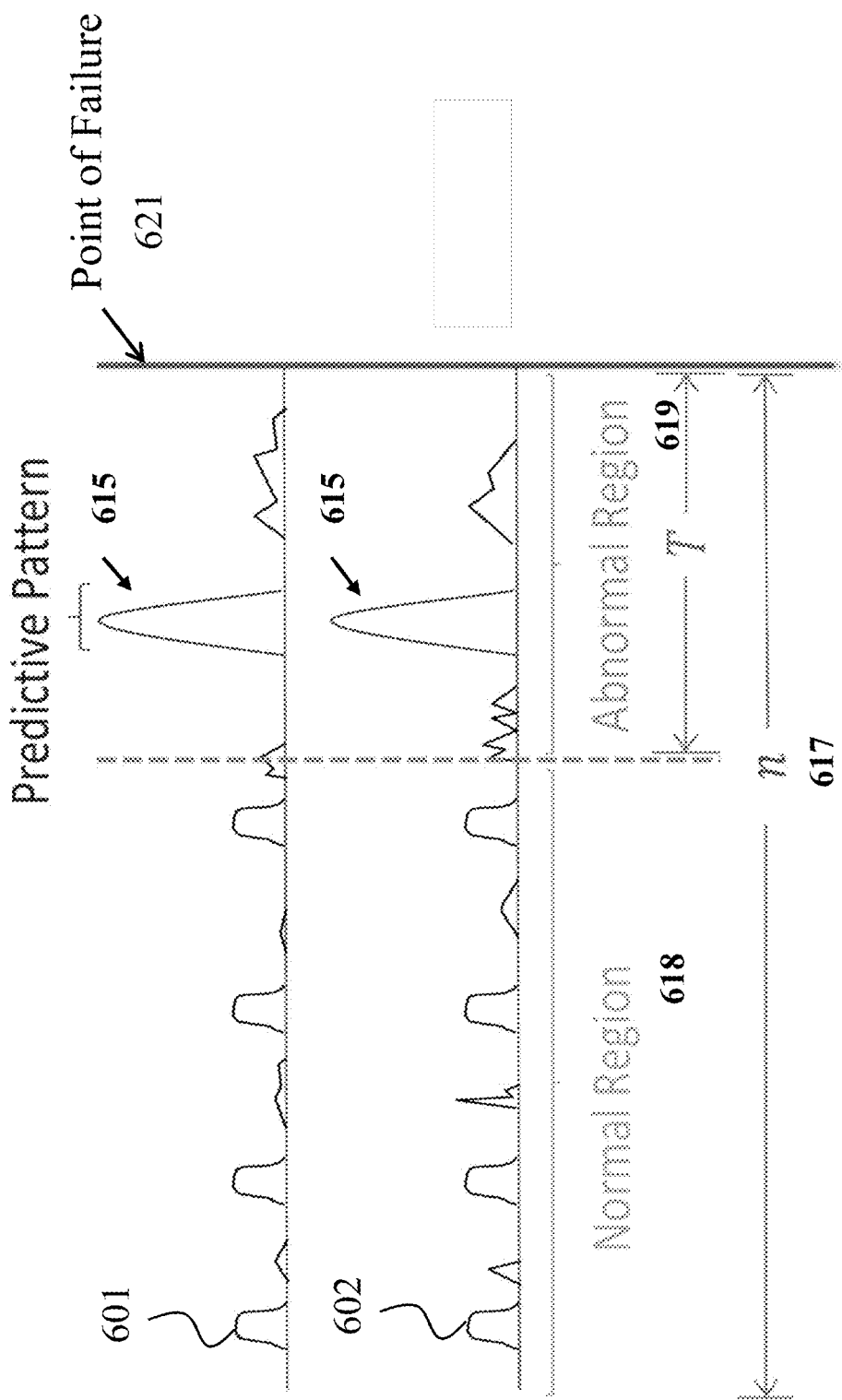
FIG. 6 shows a graph illustrating analysis of state of performance based on a signal isolated according to some embodiments.

FIG. 6 shows a graph illustrating analysis of state of performance based on a signal isolated according to some embodiments. Having a neural network 131 trained for signal separation, some embodiments use the outputs of this network to train a state estimator 135 for estimating the state of performance of a task. For example, in one embodiment, the state estimator is trained on the signals 601 and 602 generated by the tool performing the task and extracted by the neural network from different acoustic mixtures of different repetitions of the operation of the system.

For example, in some embodiments, the state estimator 135 is configured to detect a predictive pattern 615 indicative of the state of the performance. For example, real-valued time series of isolated signal collected over a period 617 can include a normal region 118 and abnormal region T 119 leading to a point of failure 121. The state estimator 135 can be configured to detect abnormal region 619 to prevent the failure 621. For example, in some implementation, the state estimator 135 uses a Shapelet discovery method to search for the predictive pattern until the best predictive pattern is found. At least one advantage of using the Shapelet discovery algorithm is for obtaining an efficient search for the predictive pattern of different lengths. Internally, the Shapelet discovery is optimizing the predictive pattern according to predetermined measurement criteria, e.g., the predictive pattern should be as similar as possible to one pattern in the abnormal region and as different as possible from all patterns in the normal region.

Additionally, or alternatively, in a different embodiment, the state estimator 135 is implemented as a neural network trained to estimate the state of the performance of the task from the outputs of the extraction neural network 131. Advantageously, the state estimator of this embodiment can be jointly trained with both the neural network 131 and a classifier used for training the neural network 131. In such a manner, this embodiment provide end-to-end training solution for controlling complex machinery.

Notably, in some embodiments, each sample of the extracted signal generated by the tool performing the task defines a state of performance of the task, while insufficient to define a state of the operation of the system. However, the state of performance of the task is sufficient to select appropriate control action. In such a manner, the embodiments provide dimensionality reduction in manufacturing automation applications.

For example, in some embodiments the system is configured to perform a sequence of operations for machining a workpiece. The tool in these embodiments is a machining tool, the processor performs a computer numerical control (CNC) of actuating the machining tool along a tool path, and the signal generated by the machining tool is a vibration signal generated by deformation of the workpiece during its machining by the machining tool. A number of machining systems have multiple actuators for positioning the tool. In addition, a number of machining systems can have redundant actuators for positioning the tool along each degree of freedom. In addition, a type of the tool can also influence performance of the system. However, all these varieties can be captured by embodiments based on isolation and classification of a signal indicative of the performance of the task.

Figure 7:
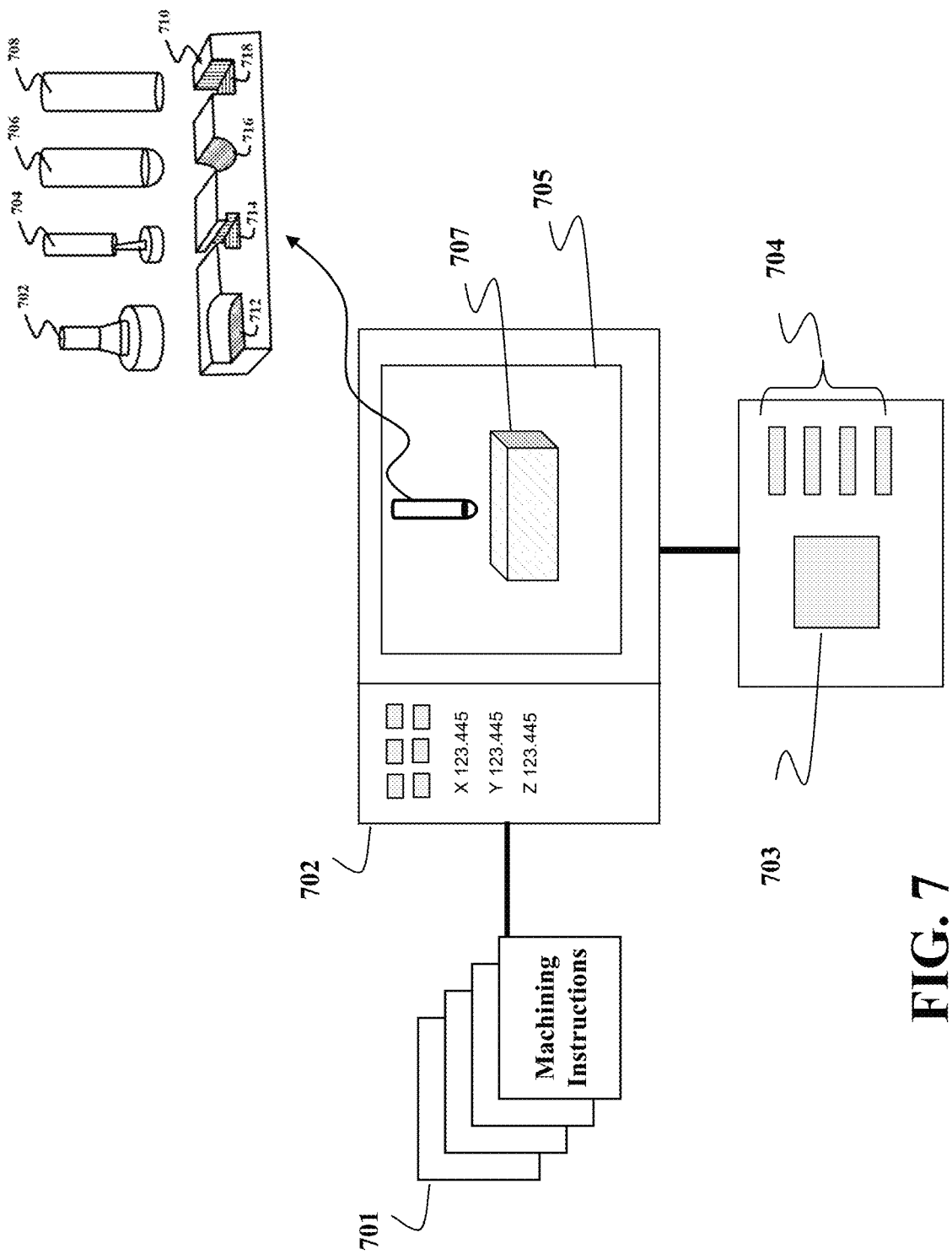
FIG. 7 shows a schematic of controlling machining operations according to some embodiments.

FIG. 7 shows a schematic of controlling machining operations according to some embodiments. The set of machining instructions 701 is provided to an NC machining controller 702, e.g., either as a file over a network. The controller 702 includes of a processor 703, memory 704 and a display 705 for showing the operation of the machine. The processor runs the extraction neural network 131, the state estimation 135 of the state machining, and the controller operations 137 according to some embodiments. In some implementations, the neural network 131, the state estimator 135, and the controller 137 are adapted for different tools 702, 704, 706, and 708 of the machining performing different kind of machining 712, 714, 716, 718 of the workpiece 710. For example, the controlled machine can perform a sequence of operations of manufacturing a workpiece including one or combination of machining, soldering, and assembling the workpiece, such that the signal generated by the tool is a vibration signal generated by modification of the workpiece during its manufacturing.

In effect, the state estimation based on extracted signal adapt the control to different kind of complex manufacturing. However, some embodiments are not limited to only factory automation. For example, in one embodiment, the controlled machine is a gearbox to be monitored for potential anomalies, and the gearbox can only be recorded in the presence of vibrations from the motor, coupling, or other vibrations from the moving part.

Additionally, or alternatively to dimensionality reduction, some embodiments allow to independently control different tools performing different tasks of operations. For example, when the analysis is performed on signals representing the state of the entire system, such an analysis can provide a control for the entire system. However, when analyses are performed separately for different tools performing different tasks, independent control of the tools is possible.

To that end, when during the operation of the system multiple tools perform multiple tasks, some embodiments perform independent control of the tasks. For example, in one embodiment control a system having a first tool performing a first task and a second tool performing a second task. The neural network is trained to separate from the acoustic mixture a first signal generated by the first tool performing the first task and a second signal generated by the second tool performing the second task. During the operation of the system, the first signal and the second signal are extracted from the acoustic mixture using the neural network and analyzed independently from each other to estimate a first state of performance of the first task and a second state of performance of the second task. The embodiment is configured to execute a first control action selected according to the first state and execute a second control action selected according to the second state.

Figure 8:
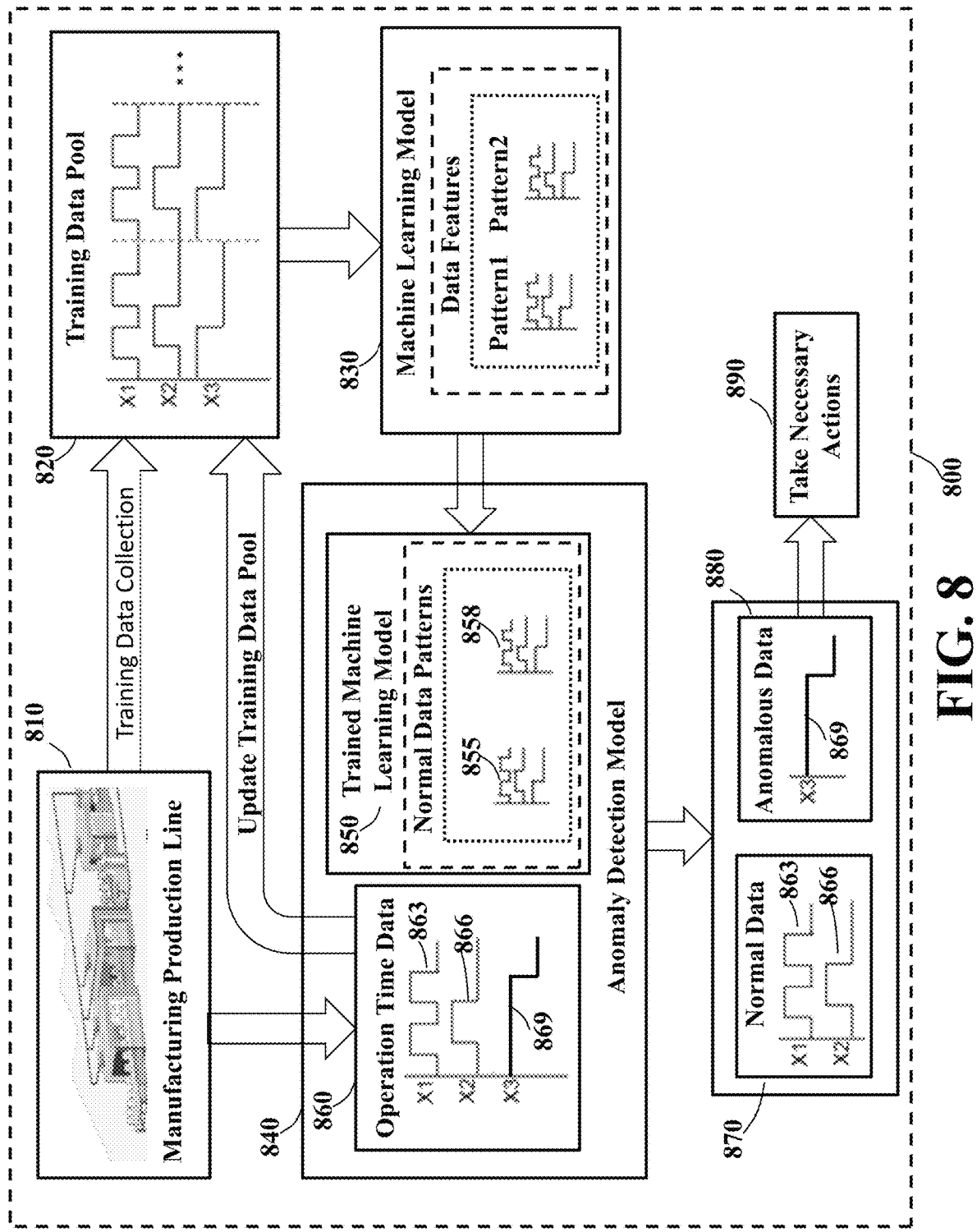
FIG. 8 shows a schematic diagram illustrating actuators of the manufacturing anomaly detection system according to some embodiments.

FIG. 8 shows a schematic diagram illustrating actuators of the manufacturing anomaly detection system 800 according to some embodiments. The system 800 includes manufacturing production line 810, a training data pool 820, machine learning model 830 and anomaly detection model 840. The production line 810 uses sensors to collect data. The sensor can be digital sensors, analog sensors, and combination thereof. The collected data serve two purposes, some of data are stored in training data pool 820 and used as training data to train machine learning model 830 and some of data are used as operation time data by anomaly detection model 840 to detect anomaly. Same piece of data can be used by both machine learning model 830 and anomaly detection model 840.

To detect anomaly in a manufacturing production line 810, the training data are first collected. The training data in training data pool 820 are used by machine learning model 830 to train an extraction neural network 131. The training data pool 820 can include either labeled data or unlabeled data. The labeled data have been tagged with labels, e.g., anomalous or normal. Unlabeled data have no label. Based on types of training data, machine learning model 830 applies different training approaches. For labeled training data, supervised learning is typically used and for unlabeled training data, unsupervised learning is typically applied. In such a manner, different embodiments can handle different types of data.

Machine learning model 830 learns features and patterns of the training data, which include the normal data patterns and abnormal data patterns. The anomaly detection model 840 uses the trained machine learning model 850 and the collected operation time data 860 to perform anomaly detection. The operation time data 860 can be identified normal or abnormal. For example, using normal data patterns 855 and 858, the trained machine learning model 850 can classify operation time data into normal data 870 and abnormal data 880. For example, operation time data X1 863 and X2 866 are classified as normal and operation time data X3 869 is classified as anomalous. Once anomaly is detected, necessary actions are taken 890.

In some embodiments, the extraction neural network is trained for each monitored process X1 863 and X2 866 and X3 869. The controller can take actions 890 to control one process, e.g., process X1 863, independently from other processes, e.g., processes X2 866 and X3 869. Such process control separation based on signal extraction simplifies the control of complex manufacturing processes and makes such a control more accurate and practical.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit actuator. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A system for controlling an operation of a machine including a plurality of actuators assisting one or multiple tools to perform one or multiple tasks, comprising:
an input interface configured to receive during the operation of the system an acoustic mixture of signals generated by a tool performing a task and by the plurality of actuators actuating the tool;
a memory configured to store a neural network trained to separate from the acoustic mixture a signal generated by the tool performing the task from signals generated by the actuators actuating the tool; and
a processor configured to submit the acoustic mixture of signals into the neural network to extract the signal generated by the tool performing the task from the acoustic mixture of signals; analyze the extracted signal to produce a state of performance of the task; and execute a control action selected according to the state of performance of the task, wherein, during the operation of the machine, multiple tools perform multiple tasks including a first tool performing a first task and a second tool performing a second task, wherein the neural network is trained to separate from the acoustic mixture a first signal generated by the first tool performing the first task and a second signal generated by the second tool performing the second task, wherein, during the operation of the system, the processor is configured to extract the first signal and the second signal from the acoustic mixture using the neural network, analyze the first signal independently from the second signal to estimate a first state of performance of the first task and a second state of performance of the second task, and execute a first control action selected according to the first state and execute a second control action selected according to the second state.

2. The system of claim 1, wherein the machine is configured to perform a sequence of operations for machining a workpiece, wherein the tool is a machining tool, the processor performs a computer numerical control (CNC) of actuating the machining tool along a tool path, and wherein the signal generated by the machining tool is a vibration signal generated by deformation of the workpiece during its machining by the machining tool.

3. The system of claim 1, wherein the machine is configured to perform a sequence of operations of manufacturing a workpiece including one or combination of machining, soldering, and assembling the workpiece, such that the signal generated by the tool is a vibration signal generated by modification of the workpiece during its manufacturing.

4. The system of claim 1, wherein the machine is a gearbox to be monitored for potential anomalies, wherein the gearbox can only be recorded in the presence of vibrations from the motor, coupling, or other vibrations from the moving part.

5. The system of claim 1, wherein the neural network is trained to separate different signals from the acoustic mixture such that each separated signal belongs to only one class of signals present in the operation of the system, while the separated signals sum up to the acoustic mixture.

6. The system of claim 5, wherein the classes of signals present in the operation of the system are identified by weak labels, each weak label specifies a class of a signal present at some point during the operation.

7. The system of claim 6, wherein the neural network is jointly trained with a classifier configured to classify the classes of the signals identified by the weak labels.

8. The system of claim 7, wherein the neural network is a jointly trained with the classifier to minimize a loss function including a cross-entropy term between the weak labels and the of the separation neural network run through the classifier.

9. The system of claim 6, wherein the neural network is trained such that when a separated signal of a class identified by the weak labels is submitted as an input to the neural network, the neural network produces this separated signal as an output.

10. The system of claim 1, wherein the processor executes a state estimator to estimate the state of performance of the task, wherein the state estimator is trained on the signals generated by the tool performing the task and extracted by the neural network from different acoustic mixtures of different repetitions of the operation of the system.

11. The system of claim 1, wherein each sample of the extracted signal generated by the tool performing the task defines a state of performance of the task, while insufficient to define a state of the operation of the machine.

12. The system of claim 1, wherein the signal generated by the tool performing the task is mixed with signals generated by the actuators actuating the tool to occupy the same time and frequency spectrum in the acoustic mixture.

13. The system of claim 1, wherein the acoustic mixture comes from a single channel of an output of a single microphone.

14. The system of claim 1, wherein at least some of the actuators overlap spatially based on their physical location in the machine.

15. A method for controlling an operation of a machine including a plurality of actuators assisting one or multiple tools to perform one or multiple tasks, wherein the method uses a processor coupled with stored instructions implementing the method, wherein the instructions, when executed by the processor carry out steps of the method, comprising:
receiving an acoustic mixture of signals generated by a tool performing a task and by the plurality of actuators actuating the tool;
submitting the acoustic mixture of signals into a neural network trained to separate from the acoustic mixture a signal generated by the tool performing the task from signals generated by the actuators actuating the tool to extract the signal generated by the tool performing the task from the acoustic mixture of signals;
analyzing the extracted signal to produce a state of performance of the task; and
executing a control action selected according to the state of performance of the task wherein, during the operation of the machine, multiple tools perform multiple tasks including a first tool performing a first task and a second tool performing a second task, wherein the neural network is trained to separate from the acoustic mixture a first signal generated by the first tool performing the first task and a second signal generated by the second tool performing the second task, wherein, during the operation of the system, the processor is configured to extract the first signal and the second signal from the acoustic mixture using the neural network, analyze the first signal independently from the second signal to estimate a first state of performance of the first task and a second state of performance of the second task, and execute a first control action selected according to the first state and execute a second control action selected according to the second state.

16. The method of claim 1, wherein the signal generated by the tool performing the task is mixed with signals generated by the actuators actuating the tool to occupy the same time and frequency spectrum in the acoustic mixture.

17. The method of claim 1, wherein the acoustic mixture comes from a single channel of an output of a single microphone.

18. The method of claim 1, wherein at least some of the actuators overlap spatially based on their physical location in the machine.

19. A non-transitory computer readable storage medium embodied thereon a program executable by a processor for performing a method, the method comprising:
receiving an acoustic mixture of signals generated by a tool performing a task and by the plurality of actuators actuating the tool;
submitting the acoustic mixture of signals into a neural network trained to separate from the acoustic mixture a signal generated by the tool performing the task from signals generated by the actuators actuating the tool to extract the signal generated by the tool performing the task from the acoustic mixture of signals;
analyzing the extracted signal to produce a state of performance of the task; and
executing a control action selected according to the state of performance of the task, wherein the neural network is trained to separate different signals from the acoustic mixture such that each separated signal belongs to only one class of signals present in the operation of the system, while the separated signals sum up to the acoustic mixture, wherein the classes of signals present in the operation of the system are identified by weak labels, each weak label specifies a class of a signal present at some point during the operation, wherein the neural network is jointly trained with a classifier configured to classify the classes of the signals identified by the weak labels, and wherein the neural network is a jointly trained with the classifier to minimize a loss function including a cross-entropy term between the weak labels and the of the separation neural network run through the classifier.

* * * * *